US008368821B2

(12) United States Patent
Yokota et al.

(10) Patent No.: US 8,368,821 B2
(45) Date of Patent: Feb. 5, 2013

(54) BASE FOR DISPLAY SCREEN

(75) Inventors: Katsuyuki Yokota, Daito (JP);
Toshiharu Hibi, Daito (JP)

(73) Assignee: Funai Electric Co., Ltd., Daito-shi (JP)

( * ) Notice: Subject to any disclaimer, the term of this patent is extended or adjusted under 35 U.S.C. 154(b) by 1482 days.

(21) Appl. No.: 11/939,285

(22) Filed: Nov. 13, 2007

(65) Prior Publication Data
US 2008/0111928 A1 May 15, 2008

(30) Foreign Application Priority Data
Nov. 14, 2006 (JP) ................. 2006-009272

(51) Int. Cl.
H04N 5/64 (2006.01)
G06F 1/16 (2006.01)
H05K 5/00 (2006.01)
A47B 5/00 (2006.01)
(52) U.S. Cl. ............... 348/836; 348/794; 361/679.02; 361/679.06; 312/7.2
(58) Field of Classification Search ............... 348/794, 348/827, 836–843; 361/679.02, 679.06, 361/679.2, FOR. 104; 312/7.2
See application file for complete search history.

(56) References Cited

U.S. PATENT DOCUMENTS

| | | | | |
|---|---|---|---|---|
| 2,895,770 | A * | 7/1959 | Matthews | 384/617 |
| 4,755,124 | A | 7/1988 | Tanaka et al. | |
| 5,164,203 | A | 11/1992 | Tanaka et al. | |
| 5,243,434 | A * | 9/1993 | Nodama | 348/827 |
| 5,934,640 | A | 8/1999 | Hall et al. | |
| 5,964,437 | A * | 10/1999 | Belokin et al. | 248/205.5 |
| 6,116,560 | A * | 9/2000 | Kim | 248/371 |
| 6,801,426 | B2 | 10/2004 | Ichimura | |
| 7,440,038 | B2 * | 10/2008 | Kato | 348/794 |
| 7,762,513 | B2 * | 7/2010 | Sawai et al. | 248/349.1 |
| 7,854,422 | B2 * | 12/2010 | Kameoka et al. | 248/349.1 |
| 8,094,244 | B2 * | 1/2012 | Sawai et al. | 348/836 |
| 2002/0149906 | A1 * | 10/2002 | Ichimura | 361/681 |
| 2006/0001782 | A1 | 1/2006 | Kato | |
| 2009/0290077 | A1 * | 11/2009 | Shimizu | 348/836 |

FOREIGN PATENT DOCUMENTS

JP 61-185946 A 8/1986
(Continued)

OTHER PUBLICATIONS

Japanese Office Action dated Jan. 15, 2007 with English Translation (Nine (9) pages).

(Continued)

Primary Examiner — Joshua J Michener
Assistant Examiner — Ryan Kwiecinski
(74) Attorney, Agent, or Firm — Crowell & Moring LLP

(57) ABSTRACT

This display screen turning apparatus (base for a display screen) includes a platelike base member so formed as to receive the load of a display body applied to a display screen support mechanism on a partial region and to warp in a direction opposite to the direction of deflection resulting from the load of the display body with a prescribed amount of warpage when not receiving the load of the display body, and the prescribed amount of warpage is so set that the surface of the base member is substantially flattened when the base member receives the load of the display body applied to the display screen support mechanism.

13 Claims, 12 Drawing Sheets

FOREIGN PATENT DOCUMENTS

| | | | |
|---|---|---|---|
| JP | 2002-311845 A | | 10/2002 |
| JP | 2002311845 A | * | 10/2002 |
| JP | 2004-314466 A | | 11/2004 |
| JP | 2006-126544 A | | 5/2006 |
| JP | 2006-243568 A | | 9/2006 |
| JP | 2006243568 A | * | 9/2006 |

OTHER PUBLICATIONS

Japanese Office Action dated Apr. 10, 2007 with English Translation (Ten (10) pages).

European Search Report dated Oct. 6, 2010 (six (6) pages).

* cited by examiner

BASE FOR DISPLAY SCREEN

BACKGROUND OF THE INVENTION

1. Field of the Invention

The present invention relates to a base for a display screen, and more particularly, it relates to a base for a display screen comprising a platelike base member.

2. Description of the Background Art

A base for a display screen comprising a support member for supporting the display screen and a platelike base member is known in general. This base for a display screen is so formed that the platelike base member receives the load of the display screen applied to the support member on a partial region in the vicinity of the center thereof.

Further, various structures of members receiving loads are proposed in general.

For example, Japanese Patent Laying-Open No. 61-185946 (1986) discloses a structure of a metal mold formed by convexing die faces of a drag and a cope thereby flattening the die faces of the drag and the cope when pressing the drag against the cope.

Japanese Patent Laying-Open No. 2004-314466 discloses a structure of a screen printing plate having a pattern bent in a direction opposite to a printing direction by a distance corresponding to bending of a screen printing plate in consideration of that the screen printing plate is bent in the printing direction in which a load is applied by a squeegee (brush) in screen printing.

Japanese Patent Laying-Open No. 2006-126544 discloses a structure for improving adhesiveness between two lens sheets superposed with each other by protruding the center of at least one of the lens sheets toward the other lens sheet.

In the conventional base for a display screen, however, the region of the platelike base member receiving the load is deflected downward by receiving the load of the display screen applied to the support member, whereby it is disadvantageously difficult for the platelike base member to support the support member in a flat state. Therefore, it is disadvantageously difficult to stably support the display screen.

None of Japanese Patent Laying-Open Nos. 61-185946, 2004-314466 and 2006-126544 discloses or suggests such a structure that a platelike base member of a base for a display screen receives the load of the display screen on a partial region thereof. Therefore, the aforementioned Japanese Patent Laying-Open Nos. 61-185946, 2004-314466 and 2006-126544 are different in premised structure from the present invention. Therefore, each of aforementioned Japanese Patent Laying-Open Nos. 61-185946, 2004-314466 and 2006-126544 neither points out the problem, to be solved by the present invention, that it is difficult to stably support the display screen nor describes a motivation to means for solving this problem.

SUMMARY OF THE INVENTION

The present invention has been proposed in order to solve the aforementioned problem, and an object of the present invention is to provide a base for a display screen having a platelike base member capable of supporting a support member in a flat state.

A base for a display screen according to a first aspect of the present invention comprises a support member supporting a display screen and a platelike base member so formed as to receive the load of the display screen applied to the support member on a partial region thereof and to warp in a direction opposite to the direction of deflection resulting from the load of the display screen with a prescribed amount of warpage when not receiving the load of the display screen, while the prescribed amount of warpage is so set that the surface of the base member is substantially flattened when the base member receives the load of the display screen applied to the support member.

In the base for a display screen according to the first aspect of the present invention, as hereinabove described, the platelike base member is so formed as to warp in the direction opposite to the direction of deflection resulting from the load of the display screen with the prescribed amount of warpage when not receiving the load of the display screen so that the amount of warpage of the platelike base member formed with the prescribed amount of warpage in the direction opposite to the direction of deflection resulting from the load of the display screen is canceled when the platelike base member warps in the direction of deflection (downward direction) resulting from the load of the display screen by receiving the load of the display screen applied to the support member, whereby the platelike base member can be substantially flattened. Thus, the platelike base member can support the support member in the substantially flat state, thereby stably supporting the display screen. When rotated, further, the support member can be prevented from difficulty in rotation resulting from deflection of the base member, to be smoothly rotatable.

In the aforementioned base for a display screen according to the first aspect, the prescribed amount of warpage is so set that the surface of the base member is substantially flattened when the base member receives the load of the display screen applied to the support member. According to this structure, the platelike base member can be easily substantially flattened when warping in the direction of deflection (downward direction) resulting from the load of the display screen by receiving the load of the display screen applied to the support member.

In the aforementioned base for a display screen according to the first aspect, the base member is preferably so formed that the maximum length in the anteroposterior direction of the display screen is smaller than the maximum length in the cross direction of the display screen, and the base member is preferably so formed as to warp along a direction corresponding to the anteroposterior direction of the display screen. According to this structure, the base member warps along the short-side direction (corresponding to the anteroposterior direction of the display screen) thereof, whereby the magnitude of bending moment applied to the platelike base member due to the load of the display screen can be reduced as compared with a case where the base member warps along the longitudinal direction (corresponding to the cross direction of the display screen) thereof. Thus, the deflection resulting from the load of the display screen can be canceled with a small amount of warpage.

In this case, the base member may have a substantially trapezoidal shape in plan view, and may be so formed as to warp along a direction perpendicular to the upper side or the lower side of the trapezoidal shape in plan view.

The aforementioned base for a display screen according to the first aspect preferably further comprises a first rubber leg provided under the region of the base member receiving the load of the display screen. According to this structure, the first rubber leg can support the region of the base member receiving the load while the aforementioned warping of the platelike base member is canceled and the platelike base member is substantially flattened when deflected in the direction of deflection (downward direction) resulting from the load of the display screen, whereby the base member can be inhibited from downward deflection not only by reaction force resulting from the aforementioned warping of the platelike base member but also by the first rubber leg after the platelike base member is substantially flattened. Thus, the platelike base member can be easily maintained in the flat state.

In this case, the base for a display screen preferably further comprises a plurality of rolling elements annularly arranged between the support member and the base member for receiving the load of the display screen through the support member and a holding member holding the plurality of rolling elements and having a cylindrical shape, while the first rubber leg is preferably provided under a region of the base member corresponding to the rolling elements. According to this structure, the first rubber leg can be easily arranged under the region of the base member receiving the load of the display screen, whereby the first rubber leg can easily support the region of the base member receiving the load while the aforementioned warping of the platelike base member is canceled and the platelike base member is substantially flattened when deflected in the direction of deflection (downward direction) resulting from the load of the display screen. After the platelike base member is substantially flattened, therefore, the base member can be inhibited from downward deflection not only by reaction force resulting from the aforementioned warping of the platelike base member but also by the first rubber leg, whereby the platelike base member can be maintained in the flat state. Therefore, the base member is so maintained in the flat state that the rolling members can be prevented from difficulty in rolling resulting from deflection of the base member, whereby the rolling members held by the holding member can smoothly roll on the base member.

In the aforementioned base for a display screen comprising the first rubber leg, the first rubber legs are preferably provided on the region of the base member corresponding to the rolling elements at an equiangular interval. According to this structure, the first rubber legs provided on the base member at the equiangular interval can uniformly receive the load of the base member. Thus, the base member can be more stably supported.

The aforementioned base for a display screen according to the first aspect preferably further comprises second rubber legs provided under portions in the vicinity of four corners located outside the region of the base member receiving the load of the display screen. According to this structure, the second rubber legs provided in the vicinity of the four corners of the base member can support the overall base member, whereby the base member can be more stably supported.

The aforementioned base for a display screen according to the first aspect preferably further comprises a rotating shaft portion provided at the center of the base member to protrude toward the support member, for serving as the rotation center of the support member. According to this structure, the support member can easily rotate about the rotating shaft portion.

In this case, the support member is preferably horizontally rotatable about the rotating shaft portion serving as the rotation center, the base for a display screen preferably further comprises a stop member for preventing the support member from slipping off the rotating shaft portion, and a groove portion for mounting the stop member is preferably provided on the outer peripheral surface of the rotating shaft portion in the vicinity of the upper end. According to this structure, the support member can be inhibited from slipping off the rotating shaft portion.

In the aforementioned base for a display screen according to the first aspect, the base member is preferably made of sheet metal. According to this structure, the base member can be easily warped when the same is manufactured.

A base for a display screen according to a second aspect of the present invention, comprising a support member supporting a display screen and a platelike base member receiving the load of the display screen applied to the support member on a partial region thereof, further comprises a plurality of rolling elements annularly arranged between the support member and the base member for receiving the load of the display screen through the support member, a holding member holding the plurality of rolling elements and having a cylindrical shape, and a first rubber leg provided under a region of the base member corresponding to the rolling elements, while the base member is so formed that the maximum length in the anteroposterior direction of the display screen is smaller than the maximum length in the cross direction of the display screen, and so formed as to warp in a direction opposite to the direction of deflection resulting from the load of the display screen with a prescribed amount of warpage when not receiving the load of the display screen, and the prescribed amount of warpage is so set that the surface of the base member is substantially flattened when the base member receives the load of the display screen applied to the support member.

In the base for a display screen according to the second aspect of the present invention, as hereinabove described, the platelike base member is so formed as to warp in the direction opposite to the direction of deflection resulting from the load of the display screen with the prescribed amount of warpage when not receiving the load of the display screen so that the amount of warpage of the platelike base member formed with the prescribed amount of warpage in the direction opposite to the direction of deflection resulting from the load of the display screen is canceled when the platelike base member warps in the direction of deflection (downward direction) resulting from the load of the display screen by receiving the load of the display screen applied to the support member, whereby the platelike base member can be substantially flattened. Thus, the platelike base member can support the support member in the substantially flat state, thereby stably supporting the display screen. When rotated, further, the support member can be prevented from difficulty in rotation resulting from deflection of the base member, to be smoothly rotatable. The prescribed amount of warpage is so set that the surface of the base member is substantially flattened when the base member receives the load of the display screen applied to the support member, whereby the platelike base member can be easily substantially flattened when warping in the direction of deflection (downward direction) resulting from the load of the display screen by receiving the load of the display screen applied to the support member. Further, the base member is so formed that the maximum length in the anteroposterior direction of the display screen is smaller than the maximum length in the cross direction of the display screen, and so formed as to warp along a direction corresponding to the anteroposterior direction of the display screen so that the base member warps along the short-side direction (corresponding to the anteroposterior direction of the display screen) thereof, whereby the magnitude of bending moment applied to the platelike base member due to the load of the display screen can be reduced as compared with a case where the base member warps along the longitudinal direction (corresponding to the cross direction of the display screen) thereof. Thus, the deflection resulting from the load of the display screen can be canceled with a small amount of warpage.

According to the second aspect, the first rubber leg is provided under the region of the base member receiving the load of the display screen so that the first rubber leg can support the region of the base member receiving the load while the aforementioned warping of the platelike base member is canceled and the platelike base member is substantially flattened when deflected in the direction of deflection (downward direction) resulting from the load of the display screen, whereby the base member can be inhibited from downward deflection not only by reaction force resulting from the aforementioned warping of the platelike base member but also by the first rubber leg after the platelike base member is substantially flattened. Thus, the platelike base member can be maintained in the flat state. The base for a display screen further comprises the plurality of rolling elements annularly arranged between the support member and the base member for receiving the load of the display screen through the support member and the holding member holding the plurality of rolling elements and having the cylindrical shape while the first rubber leg is provided under the region of the base member corresponding to the rolling elements so that the first rubber leg can be easily arranged under the region of the base member receiving the load of the display screen, whereby the first rubber leg can easily support the region of the base member receiving the load while the aforementioned warping of the platelike base member is canceled and the platelike base member is substantially flattened when deflected in the direction of deflection (downward direction) resulting from the load of the display screen. After the platelike base member is substantially flattened, therefore, the base member can be inhibited from downward deflection not only by reaction force resulting from the aforementioned warping of the platelike base member but also by the first rubber leg, whereby the platelike base member can be easily maintained in the flat state. Therefore, the base member is so maintained in the flat state that the rolling members can be prevented from difficulty in rolling resulting from deflection of the base member, whereby the rolling members held by the holding member can smoothly roll on the base member.

In the aforementioned base for a display screen according to the second aspect, the base member may have a substantially trapezoidal shape in plan view, and the base member may be so formed as to warp along a direction perpendicular to the upper side or the lower side of the trapezoidal shape in plan view.

In the aforementioned base for a display screen according to the second aspect, the first rubber legs are preferably provided on the region of the base member corresponding to the rolling elements at an equiangular interval. According to this structure, the first rubber legs provided on the base member at the equiangular interval can uniformly receive the load of the base member. Thus, the base member can be more stably supported.

The aforementioned base for a display screen according to the second aspect preferably further comprises second rubber legs provided under portions in the vicinity of four corners located outside the region of the base member receiving the load of the display screen. According to this structure, the second rubber legs provided in the vicinity of the four corners of the base member can support the overall base member, whereby the base member can be more stably supported.

The aforementioned base for a display screen according to the second aspect preferably further comprises a rotating shaft portion provided at the center of the base member to protrude toward the support member, for serving as the rotation center of the support member. According to this structure, the support member can easily rotate about the rotating shaft portion.

In this case, the support member is preferably horizontally rotatable about the rotating shaft portion serving as the rotation center, the base for a display screen preferably further comprises a stop member for preventing the support member from slipping off the rotating shaft portion, and a groove portion for mounting the stop member is preferably provided on the outer peripheral surface of the rotating shaft portion in the vicinity of the upper end. According to this structure, the support member can be inhibited from slipping off the rotating shaft portion.

In the aforementioned base for a display screen according to the second aspect, the base member is preferably made of sheet metal. According to this structure, the base member can be easily warped when the same is manufactured.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
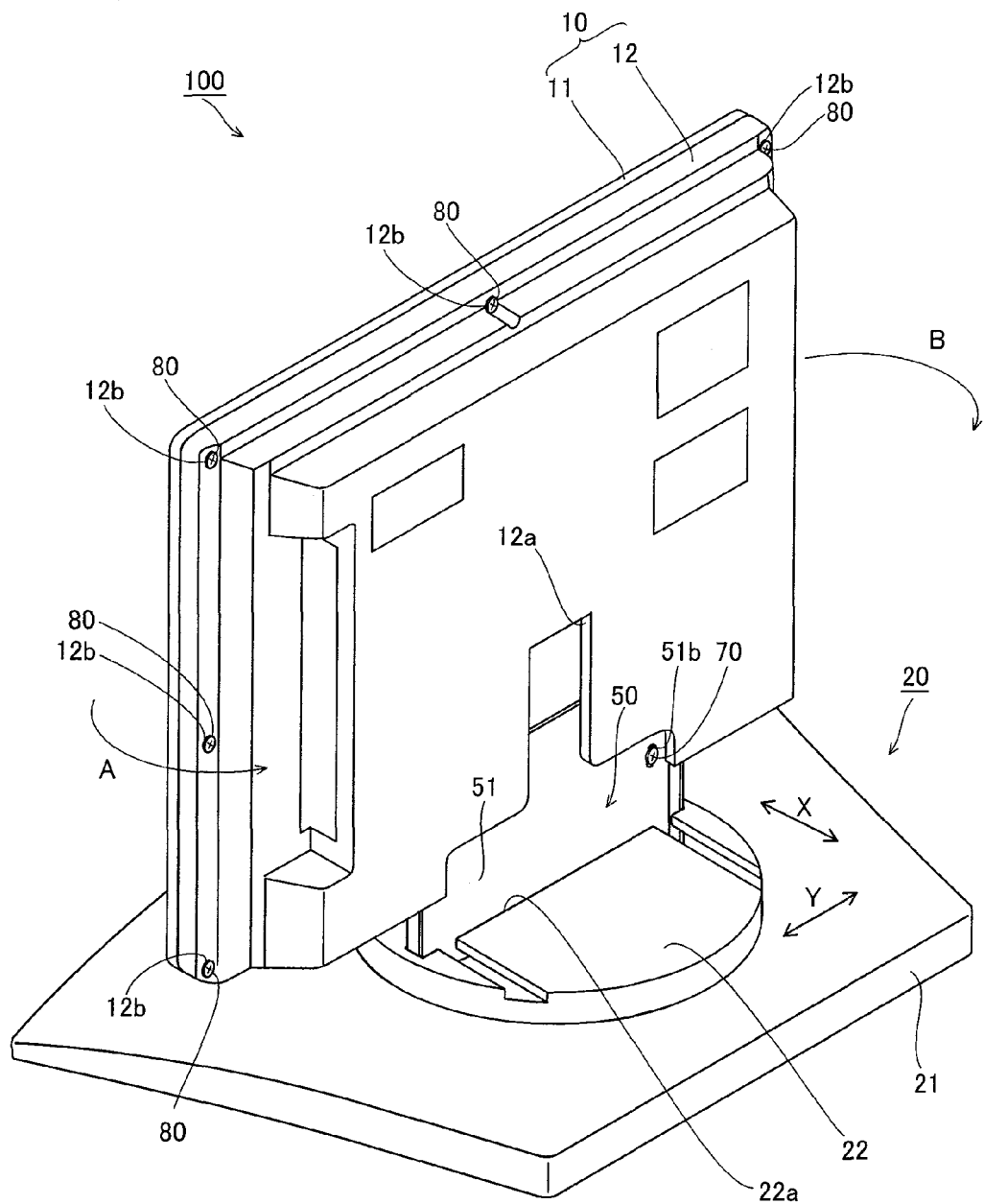
FIG. 1 is a perspective view showing the overall structure of a liquid crystal television provided with a display screen turning apparatus according to an embodiment of the present invention.

An embodiment of the present invention is now described with reference to the drawings.

The structures of a display screen turning apparatus 20 according to an embodiment of the present invention and a liquid crystal television 100 provided with the display screen turning apparatus 20 are described with reference to FIGS. 1 to 12. This embodiment of the present invention is applied to the display screen turning apparatus 20 for the liquid crystal television 100 employed as an exemplary display. This liquid crystal television 100 comprises a display body 10 and the display screen turning apparatus 20 for turning the display body 10.

The display screen turning apparatus 20 according to the embodiment of the present invention is provided for turning the display body 10 in a direction A or B (by ±30° in the present invention). The display body 10 is an example of the "display screen" in the present invention. The display screen turning apparatus 20 is constituted of a turning portion 30 for turning the display body 10 (see FIG. 2) in the direction A or B, a horizontal turn driving portion 40, formed by a plurality of gears etc. described later, provided for horizontally turning (rotating) a discoidal turntable 31 described later and a display screen support mechanism 50 provided on the turntable 31 for supporting the display body 10, as shown in FIG. 3. The display screen support mechanism 50 is an example of the "support member" in the present invention.

Figure 4:
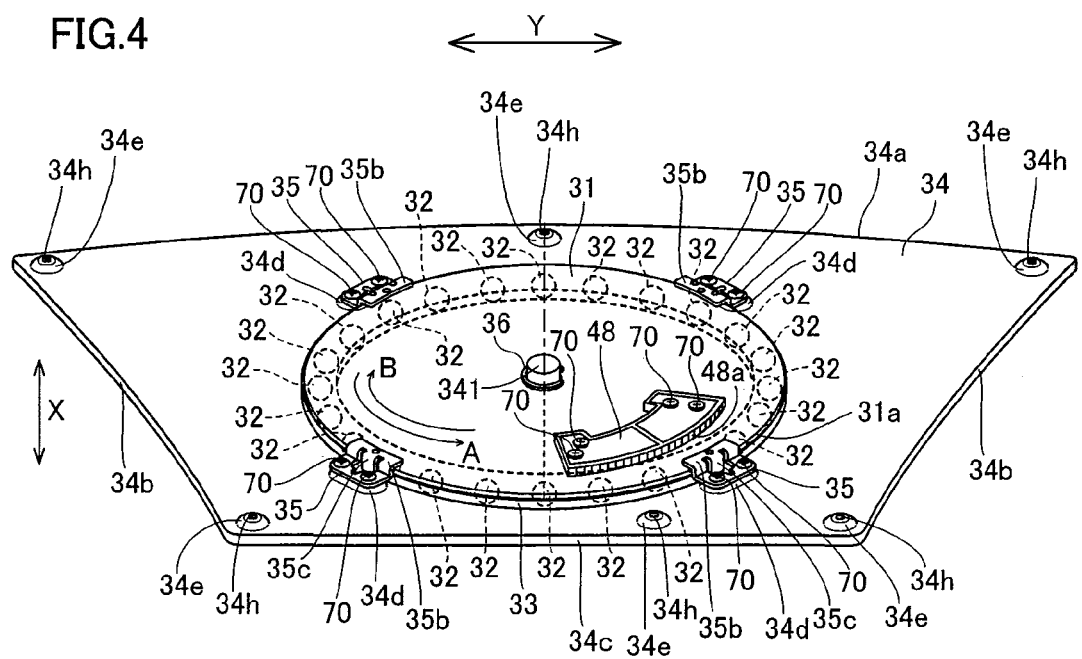
FIG. 4 is an exploded perspective view showing a turning portion of the display screen turning apparatus according to the embodiment shown in FIG. 3.
Figure 5:
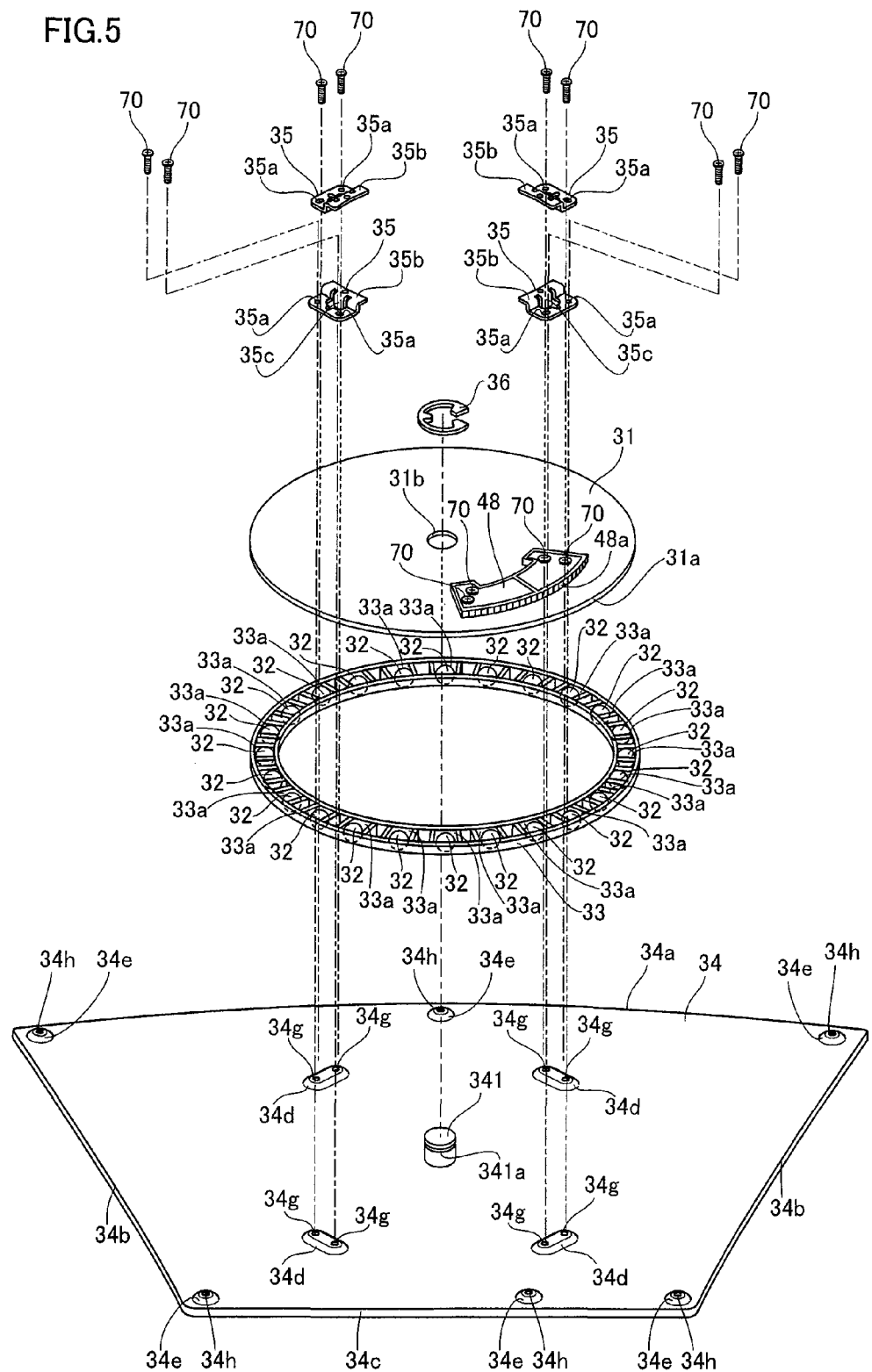
FIG. 5 is an exploded perspective view showing the turning portion of the display screen turning apparatus according to the embodiment shown in FIG. 3.

The turning portion 30 is constituted of the discoidal turntable 31 of sheet metal mounted with the display screen support mechanism 50 (see FIG. 2), 24 steel balls 32 arranged in through-holes 33a (see FIG. 5) of a holding member 33 described later, the holding member 33 of resin rotatably holding the steel balls 32, a base member 34 of sheet metal and floating prevention members 35 (four in this embodiment) of metal, as shown in FIGS. 4 and 5. The turntable 31 and the steel balls 32 are examples of the "support member" and the "rolling elements" in the present invention respectively. A hole 31b receiving a rotating shaft portion 341 described later is formed at the center of the discoidal turntable 31 of sheet metal, as shown in FIG. 5.

The holding member 33 of resin is annularly formed in plan view, as shown in FIG. 5. This holding member 33 is provided with the 24 through-holes 33a substantially rectangular (substantially square in this embodiment) in plan view at a prescribed interval. The holding member 33 has a height (vertical thickness) smaller than the diameter of the steel balls 32 and a diameter substantially equal to that of the outer peripheral surface 31a of the turntable 31. Therefore, the plurality of steel balls 32 charged into the through-holes 33a (see FIG. 5) of the holding member 33 are held between the turntable 31 and the base 34 from above and from below respectively as shown in FIG. 4, so that the turntable 31 is rotatable in the direction A or B on the base 34.

Figure 7:
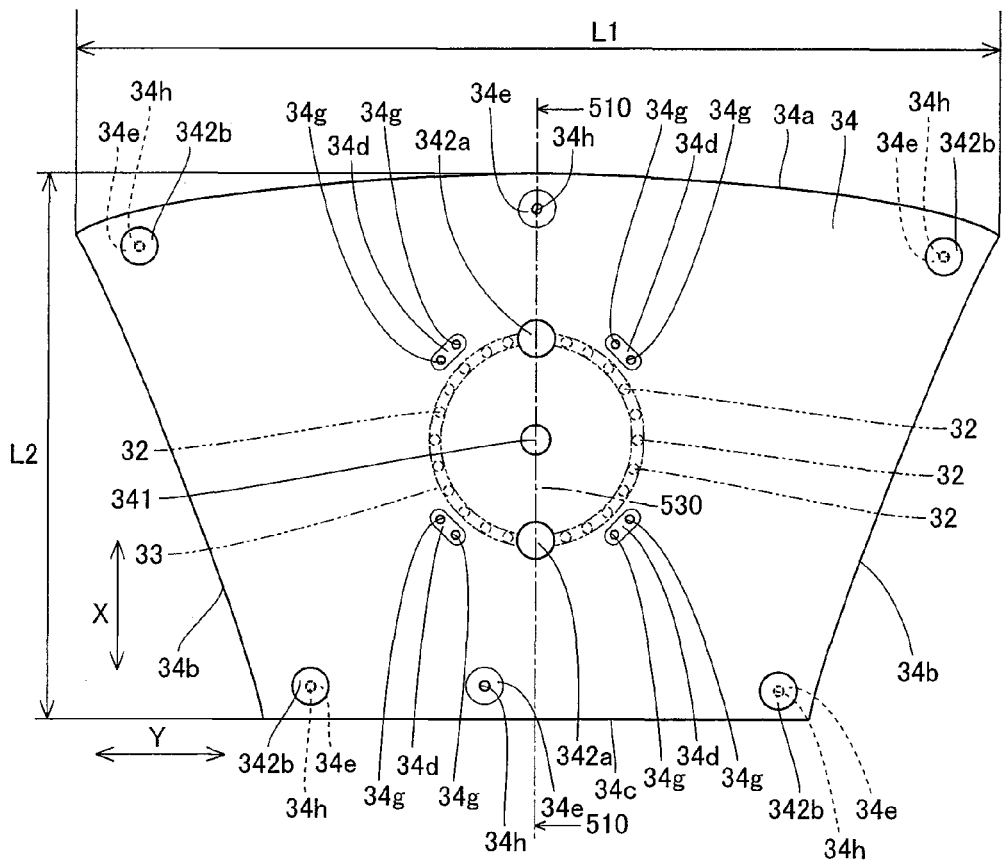
FIG. 7 is a plan view showing a base member of the display screen turning apparatus according to the embodiment shown in FIG. 3 as viewed from the bottom surface side.
Figure 11:
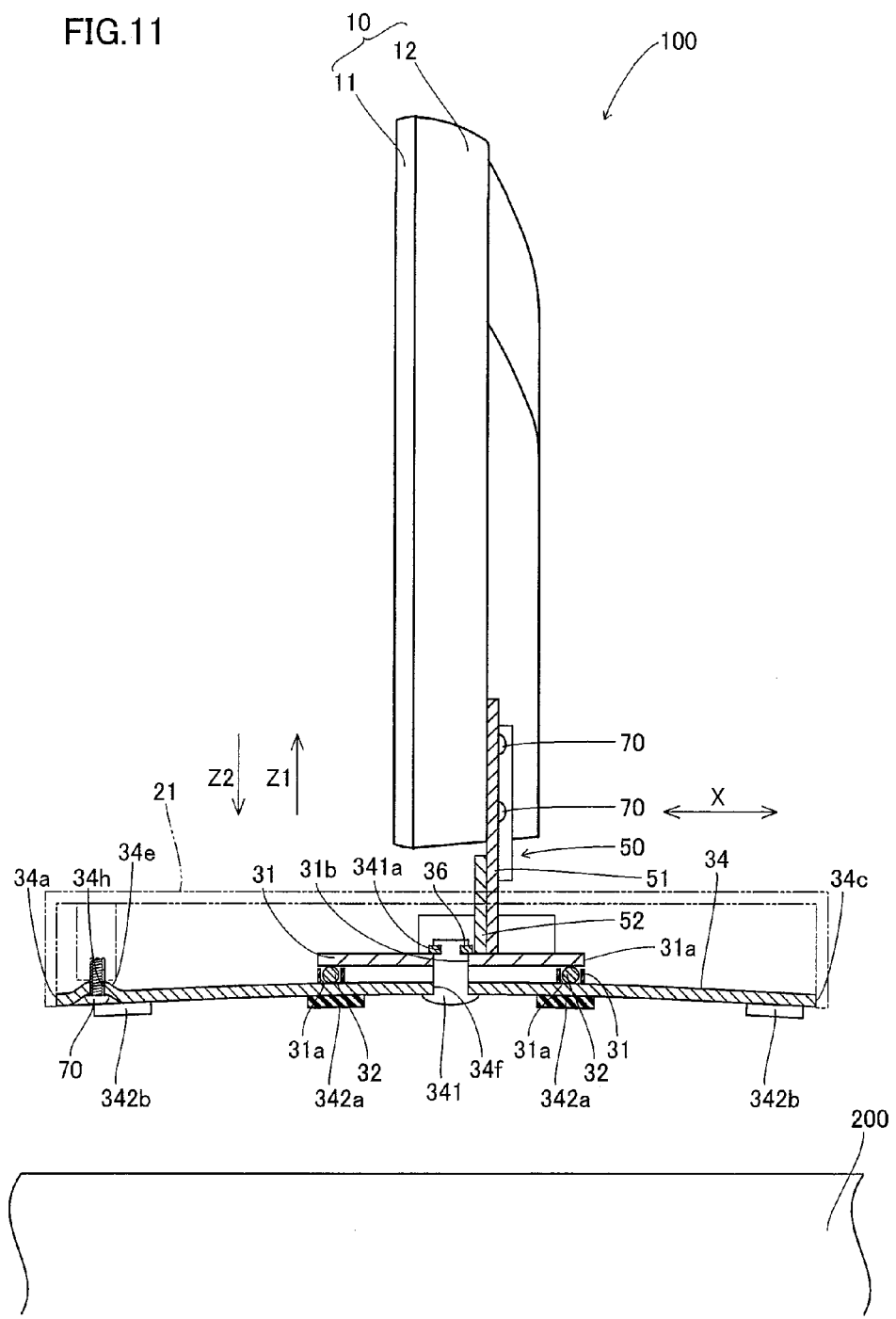
FIG. 11 is a schematic diagram showing the liquid crystal television provided with the display screen turning apparatus according to the embodiment shown in FIG. 1, in a state not yet placed on a stand.
Figure 12:
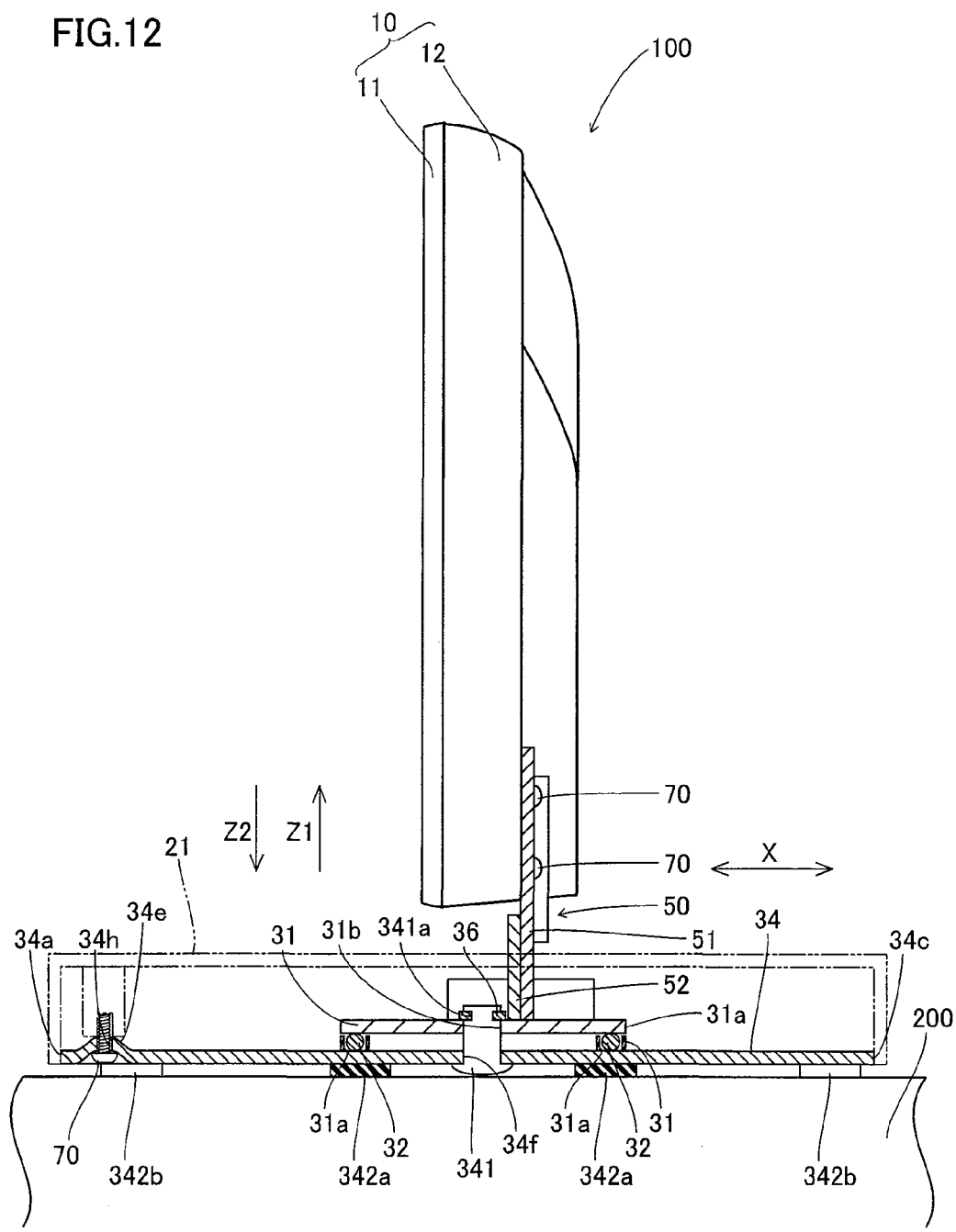
FIG. 12 is a schematic diagram showing the liquid crystal television provided with the display screen turning apparatus according to the embodiment shown in FIG. 1, in a state placed on the stand.

According to this embodiment, the platelike base member 34 has a substantially trapezoidal shape in plan view, and is so formed as to receive the load of the display body 10 (see FIG. 1) applied to the display screen support mechanism 50 and the turntable 31 through the 24 steel balls 32 stored in the holding member 33, as shown in FIGS. 4 and 5. The base member 34 has a side 34a extending substantially in the cross direction of the display body 10 on the front side of the display body 10, sides 34b extending from both ends of the side 34a in directions intersecting with the side 34a and a side 34c coupling the sides 34b with each other at the back of the display body 10. The side 34a and the sides 34c are examples of the "upper side" and the "lower side" in the present invention respectively. The base member 34 is so formed that the maximum length L2 in the anteroposterior direction (direction X in FIG. 7) of the display body 10 is smaller than the maximum length L1 in the cross direction (direction Y in FIG. 7) of the display body 10, as shown in FIG. 7. In other words, the base member 34 is longer in the cross direction (direction Y in FIG. 7) of the display body 10, and shorter in the anteroposterior direction of the display body 10 and the direction (direction X in FIG. 7) perpendicular to the side 34a or the sides 34c. As shown in FIG. 11, the base member 34 is so formed as to warp along arrow Z1 (in a direction opposite to the direction of deflection (downward direction) resulting from the load of the display body 10) with a prescribed amount of warpage (about 0.5 mm in this embodiment) in the direction X (short-side direction) when not receiving the load of the display body 10 before the liquid crystal television 100 is placed on a stand 200. The prescribed amount of warpage of the base member 34 is so set that the base member 34 is substantially flattened when receiving the load of the display body 10 after the liquid crystal television 100 is placed on the stand 200, as shown in FIG. 12.

According to this embodiment, the base member 34 is provided with four projecting portions 34d for mounting the floating prevention members 35, six projecting portions 34e for mounting a cover member 21 (see FIG. 1) described later on the base member 34 and an opening 34f (see FIG. 8) in which the rotating shaft portion 341 described later is arranged, as shown in FIGS. 4 and 5. The projecting portions 34d and 34e are formed by press working to have drawn shapes protruding upward (toward the turntable 31). The projecting portions 34d are elliptic in plan view, and formed at an equiangular interval (interval of 90° according to this embodiment), to enclose the outer peripheral surface 31a of the turntable 31 and the holding member 33. The projecting portions 34d are provided with pairs of screw mounting holes 34g for mounting the floating prevention members 35. On the other hand, the projecting portions 34e, also elliptic in plan view, are provided by threes in the vicinity of the side 34a and the side 34c respectively. Screw receiving holes 34h for mounting the cover member 21 are formed on the projecting portions 34e.

Figure 8:
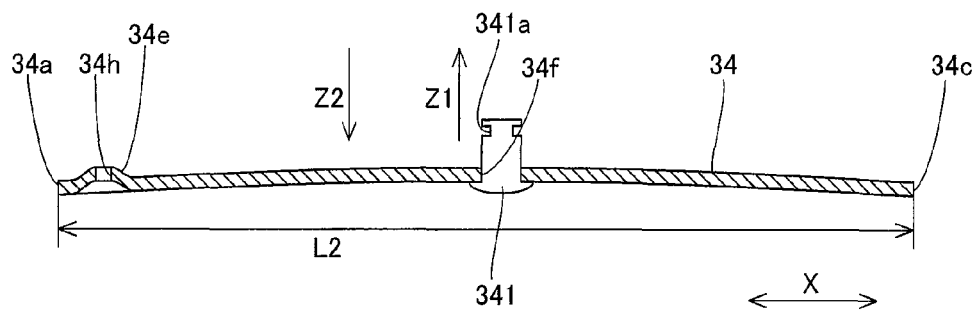
FIG. 8 is a sectional view taken along the line 510-510 in FIG. 7.

According to this embodiment, the opening 34f of the base member 34 is provided at the center of the base member 34. Thus, the rotating shaft portion 341 of metal is mounted on the center of the base member 34 by caulking, to protrude upward (toward the turntable 31) from the bottom surface of the base member 34 through the opening 34f, as shown in FIG. 8. Further, a groove portion 341a for mounting an E-ring 36 is formed on the outer peripheral surface of the rotating shaft portion 341 in the vicinity of the upper end along the circumferential direction, as shown in FIG. 5. The E-ring 36 is an example of the "stop member" in the present invention. As shown in FIG. 4, the E-ring 36 is fitted with the groove portion 341a (see FIG. 11) perpendicularly to the axial direction of the rotating shaft portion 341 to be mounted on the rotating shaft portion 341, so that the turntable 31 horizontally turns about the rotating shaft portion 341 serving as the turning center. At this time, the turntable 31 can be prevented from slipping off the rotating shaft portion 341, whereby the steel balls 32 and the holding member 33 can be held between the turntable 31 and the base member 34.

According to this embodiment, six rubber legs 342a and 342b having a thickness of about 2.5 mm are mounted on the bottom surface of the base member 34 with an adhesive, as shown in FIG. 7. Four (rubber legs 342b) of these six rubber legs 342a and 342b are provided under the projecting portions 34e provided in the vicinity of four corners located outside the region receiving the load of the display body 10. The remaining two (rubber legs 342a) of the six rubber legs 342a and 342b are provided under the region where the steel balls 32 are arranged on the upper surface of the base member 34 respectively. More specifically, the two rubber legs 342a are arranged on a centerline 530 extending in the direction X (short-side direction) of the base member 34 in the region where the steel balls 32 are arranged, on positions separated from each other at a prescribed interval. More specifically, the rubber legs 342*a* are provided at an equiangular interval of 180°. The rubber legs 342*a* and 342*b* are examples of the "first rubber leg" and the "second rubber legs" in the present invention respectively.

Figure 6:
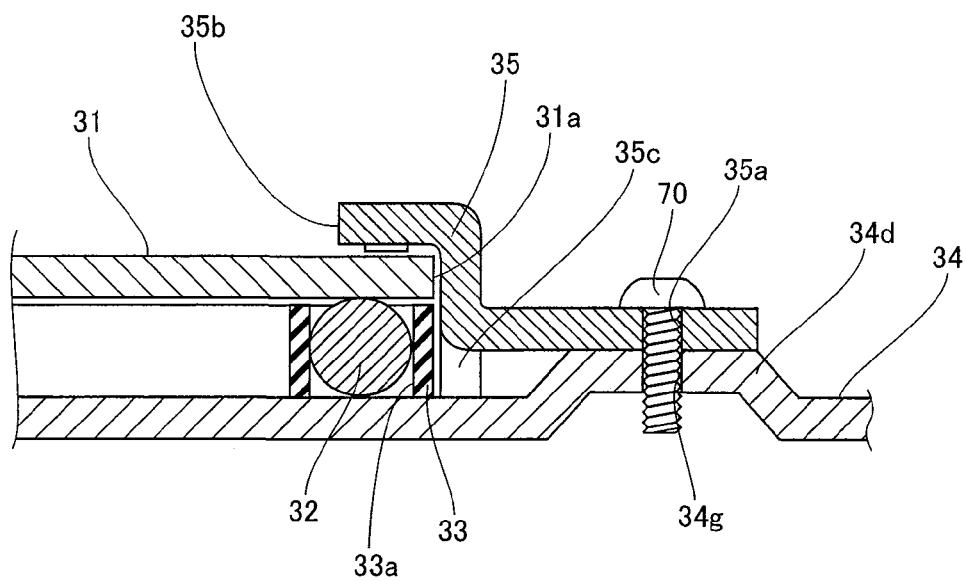
FIG. 6 is a sectional view taken along the line 500-500 in FIG. 3.

The floating prevention members 35 are mounted on the projecting portions 34*d* by screws 70 fastened to the screw receiving holes 34*g* provided on the projecting portions 34*d* through screw receiving holes 35*a* provided on the floating prevention members 35, as shown in FIGS. 5 and 6. As shown in FIG. 6, each floating prevention member 35 is so formed that a floating prevention portion 35*b* thereof inhibits the turntable 31 from vertical movement while a leg portion 35*c* thereof positions the turntable 31 and the holding member 33 in a horizontal plane when the turntable 31 rotates in the direction A or B (see FIG. 4).

The horizontal turn driving portion 40 is constituted of a transmission gear portion 41 for rotating the turntable 31 provided on the base member 34 along the direction A or B in the horizontal plane and a stepping motor 42 serving as a driving source for the transmission gear portion 41, as shown in FIG. 3. The horizontal turn driving portion 40 is arranged on the base member 34. The transmission gear portion 41 is constituted of a gear 43 of resin, a torque limiter 60 and another gear 44 of resin all arranged in a gear box 46 of resin and still another gear 45 of resin.

Figure 9:
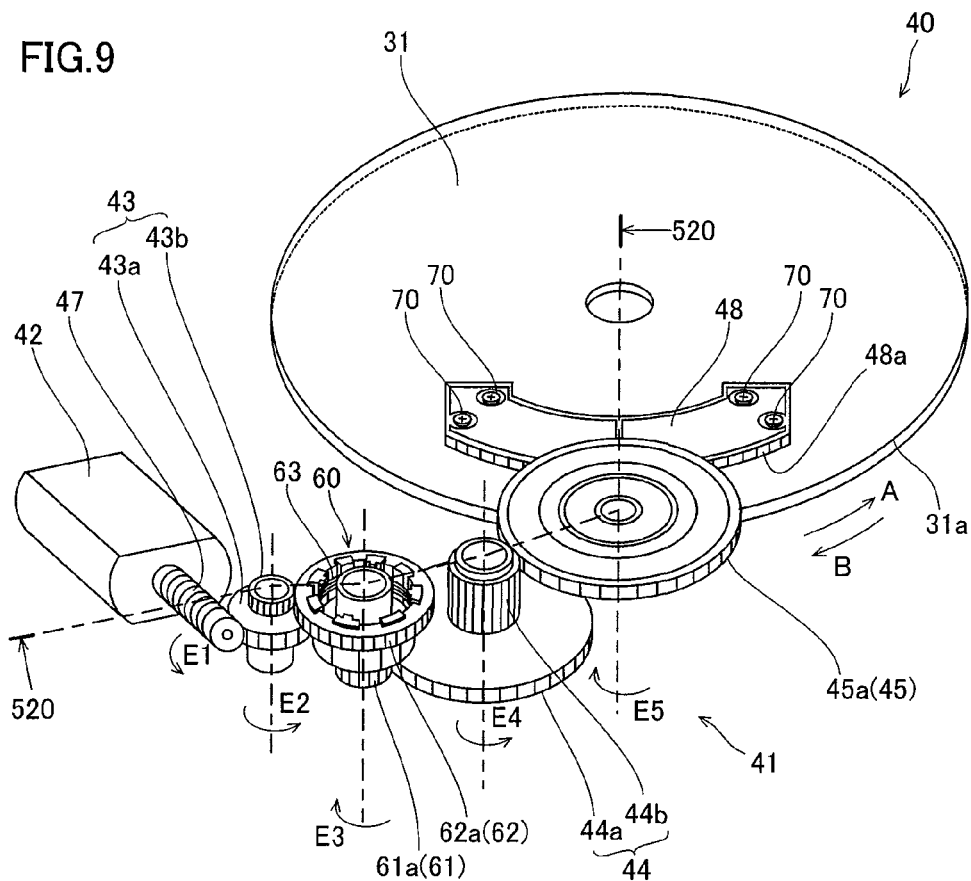
FIG. 9 is a perspective view for illustrating a horizontal turn driving portion of the display screen turning apparatus according to the embodiment shown in FIG. 3.
Figure 10:
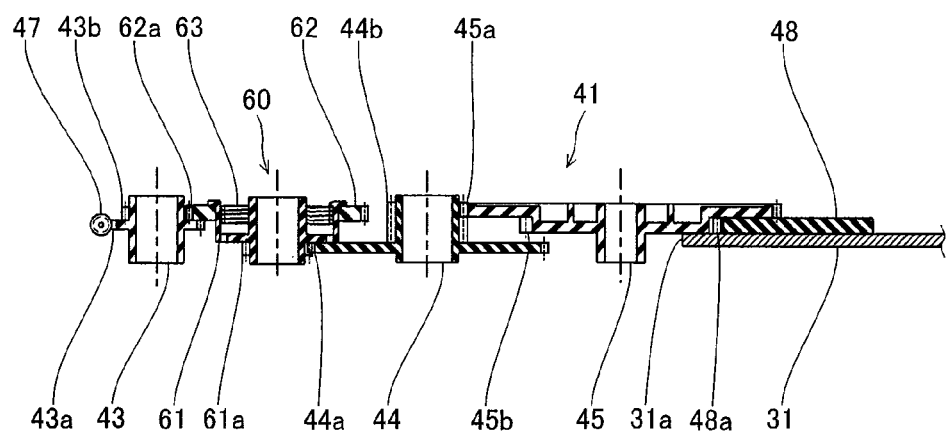
FIG. 10 is a sectional view taken along the line 520-520 in FIG. 9.

A worm gear 47 of resin is press-fitted into the rotating shaft of the stepping motor 42, as shown in FIG. 9. The gear 43 integrally includes a large-diametral gear portion 43*a* and a small-diametral gear portion 43*b*, as shown in FIGS. 9 and 10. The gear 44 also integrally includes a large-diametral gear portion 44*a* and a small-diametral gear portion 44*b*. The gear 45 integrally includes a large-diametral gear portion 45*a* and a small-diametral gear portion 45*b* (see FIG. 10). A turning gear member 48 of resin is fixed to the upper surface of the turntable 31 of the turning portion 30 with four screws 70, as shown in FIGS. 3, 4 and 9. This turning gear member 48 is so formed as to turn in a prescribed angular range (±30° according to this embodiment) through a stopper member (not shown) coming into contact therewith when the turning angle of the turntable 31 reaches a prescribed level. FIG. 9 omits the stepping motor 42 and the gear box 46 storing the gear 43, the torque limiter 60 and the gear 44, in order to illustrate the structure of the transmission gear portion 41.

As shown in FIGS. 9 and 10, the worm gear 47 meshes with the large-diametral gear portion 43*a* of the gear 43 so that the rotating shafts thereof are perpendicular to each other, while the small-diametral gear portion 43*b* of the gear 43 meshes with a gear portion 62*a* of a driving gear 62 of the torque limiter 60 so that the rotating shafts thereof are parallel to each other. A gear portion 61*a* of a driven gear 61 of the torque limiter 60 meshes with the large-diametral gear portion 44*a* of the gear 44 so that the rotating shafts thereof are parallel to each other, while the small-diametral gear portion 44*b* of the gear 44 meshes with the large-diametral gear portion 45*a* of the gear 45 so that the rotating shafts thereof are parallel to each other. Therefore, the driving force of the stepping motor 42 is transmitted to the turntable 31 through the worm gear 47, the gear 43, the torque limiter 60, the gears 44, 45 and the turning gear member 48, due to the aforementioned arrangement of these gears shown in FIGS. 9 and 10.

The torque limiter 60 is constituted of the driven gear 61 of resin, the driving gear 62 of resin and a spring member (coil spring) 63 of metal, as shown in FIGS. 9 and 10. This torque limiter 60 has a function of preventing the rotating stepping motor 42 from application of a load by cutting off the driving force transmitted from the stepping motor 42 to the turntable 31 between the driven gear 61 and the driving gear 62 when the turntable 31 turning by the driving force of the stepping motor 42 comes into contact with the stopper member (not shown) to stop turning.

The display screen support mechanism 50 is provided on the upper surface of the turntable 31, as shown in FIG. 3. The display screen support mechanism 50 is constituted of a display screen support member 51 and a reinforcing member 52 for reinforcing the display screen support member 51. The display screen support member 51 and the reinforcing member 52 are fixed to the turntable 31 with two screws 70, to extend perpendicularly to the surface of the turntable 31. The display screen support member 51 is provided adjacently to the reinforcing member 52, and coupled to the reinforcing member 52 with three screws 70.

Figure 2:
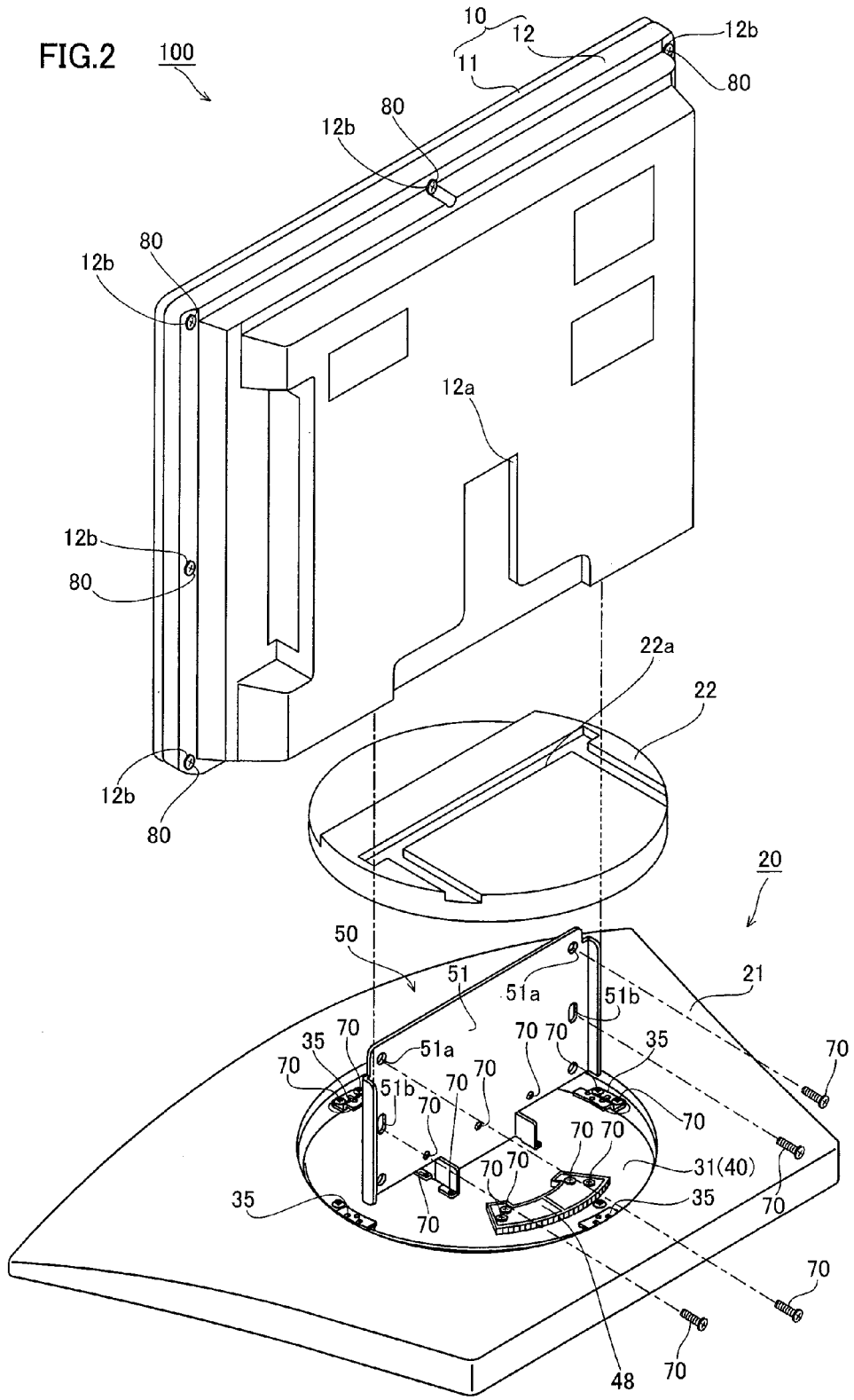
FIG. 2 is an exploded perspective view showing the overall structure of the liquid crystal television provided with the display screen turning apparatus according to the embodiment shown in FIG. 1.
Figure 3:
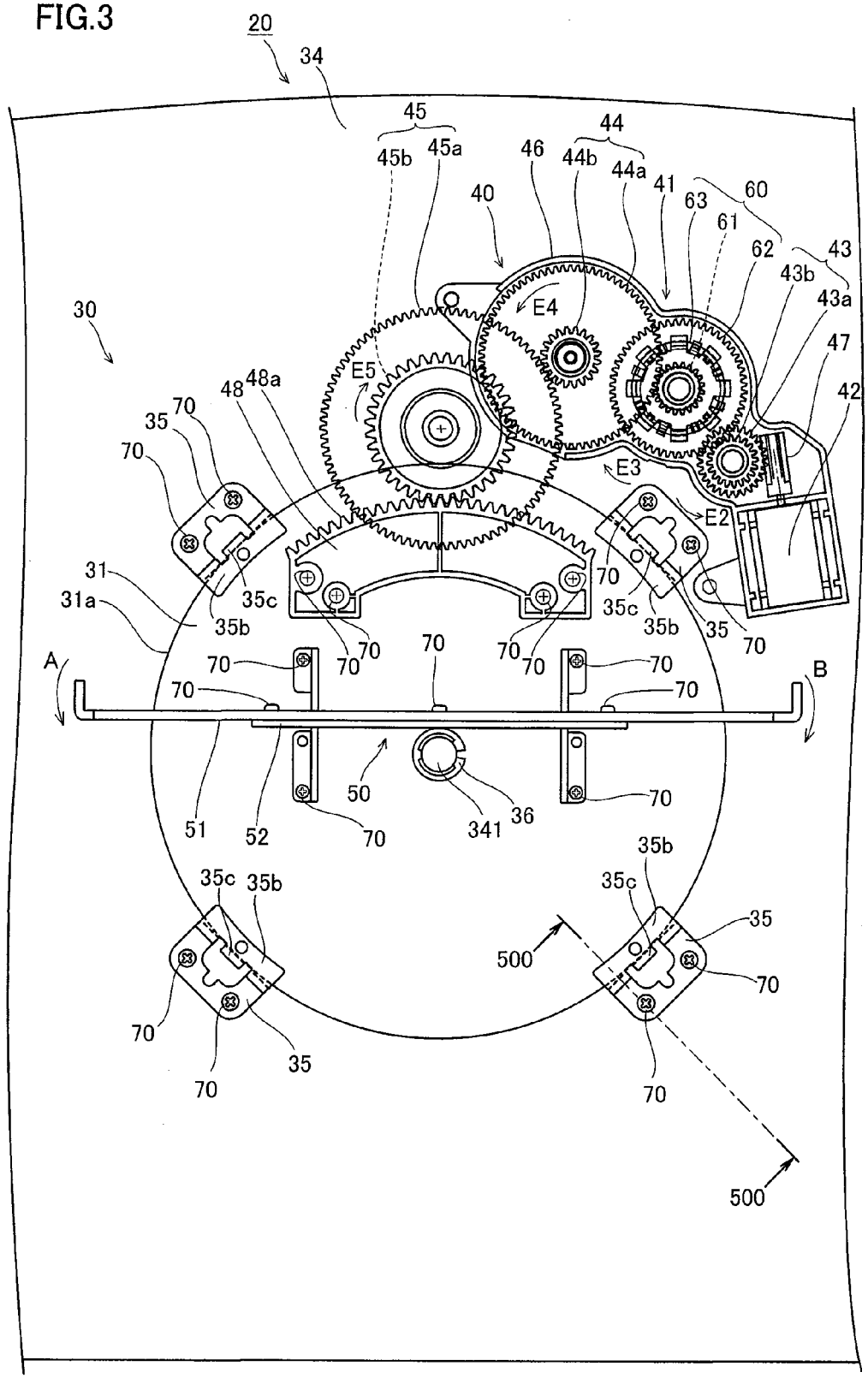
FIG. 3 is a plan view showing the display screen turning apparatus according to the embodiment shown in FIG. 1.

The display body 10 is constituted of a front cabinet 11 of resin and a rear cabinet 12 of resin, as shown in FIGS. 1 and 2. In the display body 10, a liquid crystal module (not shown) mounted with a liquid crystal panel (not shown) is enclosed with the front cabinet 11 and the rear cabinet 12. The display body 10 is mounted on the display screen support member 51 by screws 70 fastened to screw mounting holes (not shown) through screw receiving holes 51*a* and 51*b* (see FIG. 2) of the display screen support member 51. The rear cabinet 12 is integrally provided with a notch 12*a* for arranging the display screen support member 51 in a concealed manner. A plurality of screw receiving holes 12*b* (seven in this embodiment) are provided on the outer periphery of the rear cabinet 12, so that the rear cabinet 12 is mounted on the front cabinet 11 with screws 80.

The cover member 21 and another cover member 22 of resin are mounted on the display screen turning apparatus 20, as shown in FIGS. 1 and 2. More specifically, the cover member 21 is mounted on the base member 34 by screws 70 (see FIG. 12) mounted from below the bottom surface of the base member 34 through the screw receiving holes 34*h* (see FIG. 4). The cover member 22 is so provided as to cover the upper portion of the turntable 31 (see FIG. 3) and to be turnable in the direction A or B along with the turntable 31. The cover member 22 of resin is provided with a receiving hole 22*a* for receiving the display screen support mechanism 50.

A turning operation of the display screen turning apparatus 20 according to this embodiment is now described with reference to FIGS. 1, 3, 4, 9, 10, 13 and 14.

In the state where the display screen support member 51 is directed frontward (the state where the center of the turning gear portion 48*a* of the turning gear member 48 meshes with the small-diametral gear portion 45*b* of the gear 45) as shown in FIG. 3, the user presses an automatic turning button (not shown) of an attached remote controller (not shown), so that a signal for turning the display body 10 (see FIG. 1) in the direction A is transmitted to a control circuit portion (not shown) of the display body 10. The stepping motor 42 of the display screen turning apparatus 20 is driven on the basis of this signal. More specifically, the stepping motor 42 is so driven that the worm gear 47 mounted thereon rotates in a direction E1 (see FIG. 9), as shown in FIG. 3. Thus, the gear 43 rotates in a direction E2, the driving gear 62 and the driven gear 61 of the torque limiter 60 rotate in a direction E3, the gear 44 rotates in a direction E4, the gear 45 rotates in a direction E5, and the turning gear member 48 rotates in the direction A. Therefore, the turntable 31 mounted with the display screen support member 51 starts turning in the direction A, whereby the display body 10 (see FIG. 1) also starts turning in the direction A.

While the user presses the automatic turning button (not shown) of the attached remote controller (not shown), the turntable 31 receiving the display body 10 (see FIG. 1) thereon continuously turns in the direction A at a prescribed rotational speed. At this time, the floating prevention portions 35b and the leg portions 35c of the four floating prevention members 35 prevent backlash in the axial direction of the rotating shaft portion 341 of the turntable 31 and in the direction perpendicular thereto, so that the turntable 31 is turnable.

When the display body 10 turns up to an angle desirable for the user, the user releases the automatic turning button (not shown) of the attached remote controller (not shown), so that the signal for turning the display body 10 (see FIG. 1) in the direction A is not transmitted to the control circuit portion (not shown) of the display body 10. Therefore, the stepping motor 42 is stopped. Thus, the turntable 31 stops turning in the direction A on the position shown in FIG. 13, and comes to a standstill.

Figure 14:
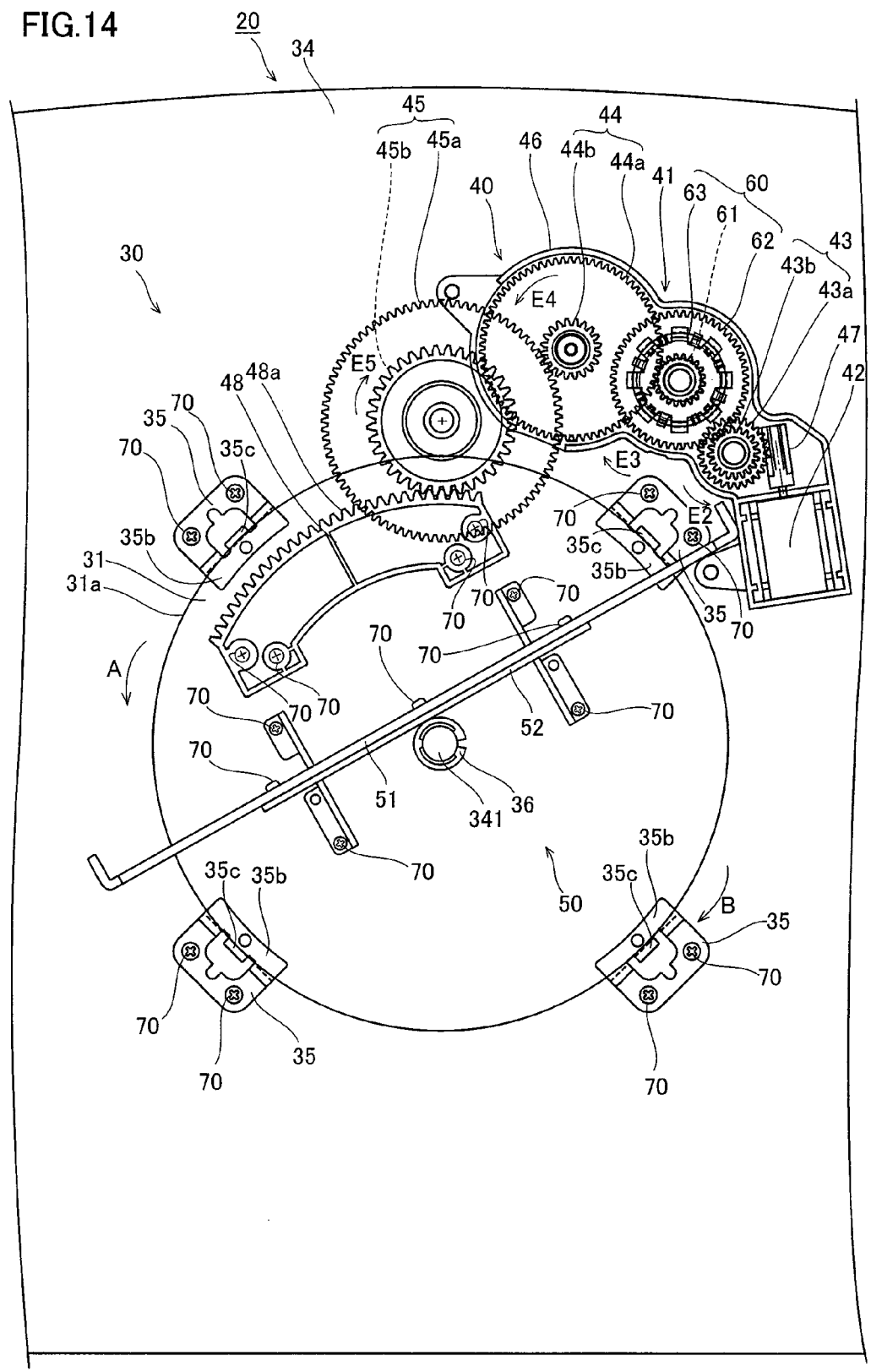

When the turning angle of the turntable 31 reaches the maximum (30° in this embodiment) while the user continuously turns the display body 10 (see FIG. 1) in the direction A (see FIG. 1), the turntable 31 comes into contact with the stopper member (not shown) provided in the turning portion 30, to be prevented from further turning in the direction A (see FIG. 1). Therefore, the turntable 31 stops turning in the direction A on the position shown in FIG. 14, and comes to a standstill. At this time, the stepping motor 42 is still continuously driven as shown in FIG. 14. Therefore, the torque limiter 60 cuts off the driving force from the stepping motor 42 between the driving gear 62 and the driven gear 61, thereby preventing the rotating stepping motor 42 from application of a load.

Figure 13:
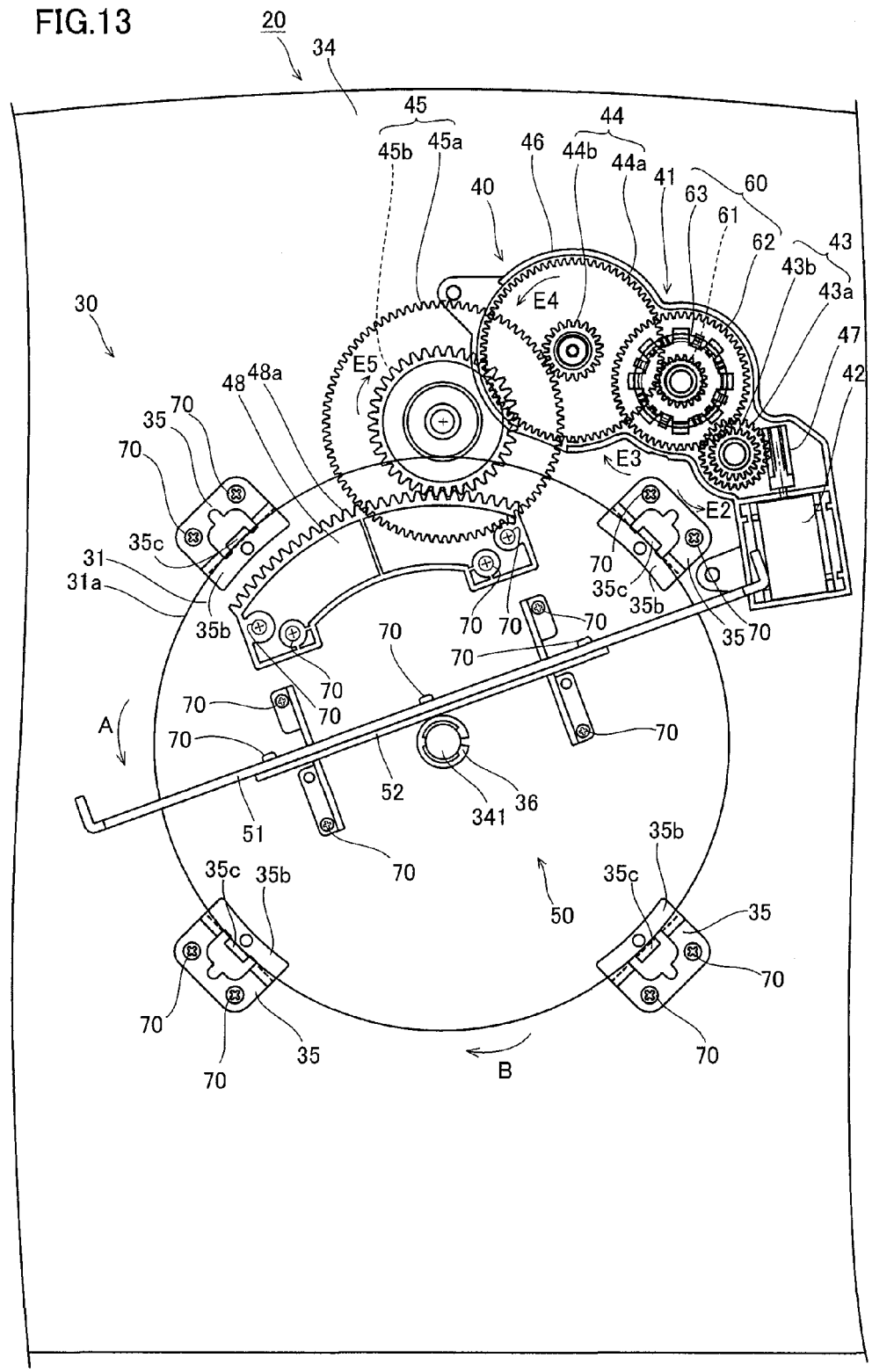
FIGS. 13 and 14 are plan views for illustrating a turning operation of the display screen turning apparatus according to the embodiment shown in FIG. 1.

While the turntable 31 turns in the direction A shown in FIG. 13 in the above description, the stepping motor 42 is oppositely driven in order to turn the turntable 31 in the direction B opposite to the direction A, thereby turning the turntable 31 in the direction B.

According to this embodiment, as hereinabove described, the platelike base member 34 is so formed as to warp along arrow Z1 (in the direction opposite to the direction of deflection resulting from the load of the display body 10) with the prescribed amount of warpage (about 0.5 mm in this embodiment) when not receiving the load of the display body 10, whereby the base member 34 warps along arrow Z2 (see FIG. 12) by receiving the load of the display body 10 when the liquid crystal television 100 is placed on the stand 200. Thus, the warping of the base member 34 along arrow Z1 (see FIG. 11) is canceled, whereby the base member 34 can be substantially flattened. Therefore, the base member 34 can support the turntable 31 in the substantially flat state, thereby stably supporting the display body 10. When rotated, further, the turntable 31 can be prevented from difficulty in rotation resulting from deflection of the base member 34 along arrow Z2 (see FIG. 12), to be smoothly rotatable.

According to this embodiment, the prescribed amount of warpage is so set that the base member 34 is substantially flattened when receiving the load of the display body 10, whereby the base member 34 can be easily substantially flattened when deflected along arrow Z2 (see FIG. 12) due to the load of the display body 10 of the liquid crystal television 100 placed on the stand 200.

According to this embodiment, the base member 34 may have a substantially trapezoidal shape in plan view, and may be so formed as to warp along the direction perpendicular to the side 34a or 34c of the trapezoidal shape in plan view.

According to this embodiment, the base member 34 is so formed that the maximum length L2 in the anteroposterior direction (direction X in FIG. 7) of the display body 10 is smaller than the maximum length L1 in the cross direction (direction Y in FIG. 7) of the display body 10 and so formed as to warp along the anteroposterior direction (direction X in FIG. 7) of the display body 10 so that the base member 34 warps along the short-side direction (direction X in FIG. 7) thereof, whereby the magnitude of bending moment applied to the base member 34 due to the load of the display body 10 can be reduced as compared with a case where the base member 34 warps along the longitudinal direction (direction Y in FIG. 7) thereof. Thus, the deflection along arrow Z2 (see FIG. 12) resulting from the load of the display body 10 can be canceled with a small amount of warpage.

According to this embodiment, the rubber legs 342a are provided under the region of the base member 34 receiving the load of the display body 10 so that the rubber legs 342a can support the region of the base member 34 receiving the load of the display body 10 while the aforementioned warping of the base member 34 is canceled and the platelike base member 34 is substantially flattened when deflected along arrow Z2 (see FIG. 12) due to the load of the display body 10, whereby the base member 34 can be inhibited from downward deflection (along arrow Z2 in FIG. 12) not only by reaction force resulting from the aforementioned warping of the platelike base member 34 but also by the rubber legs 342a after the platelike base member 34 is substantially flattened. Thus, the platelike base member 34 can be maintained in the flat state.

According to this embodiment, the display screen turning apparatus 20 is provided with the 24 steel balls 32 annularly arranged between the turntable 31 and the base member 34 for receiving the load of the display body 10 through the display screen support mechanism 50 and the turntable 31 and the annular holding member 31 holding the 24 steel balls 32 and having the annular shape while the rubber legs 342a are arranged under the region of the base member 34 corresponding to the steel balls 32 so that the rubber legs 342a can be easily arranged under the region of the base member 34 receiving the load of the display body 10, whereby the rubber legs 342a can easily support the region of the base member 34 receiving the load of the display body 10 while the aforementioned warping of the base member 34 is canceled and the platelike base member 34 is substantially flattened when deflected along arrow Z2 (see FIG. 12) due to the load of the display body 10. After the platelike base member 34 is substantially flattened, therefore, the base member 34 can be inhibited from downward deflection (along arrow Z2 in FIG. 12) not only by reaction force resulting from the aforementioned warping of the platelike base member 34 but also by the rubber legs 342a, whereby the platelike base member 34 can be easily maintained in the flat state. Therefore, the steel balls 32 can be prevented from difficulty in rotation resulting from deflection of the base member 34, whereby the steel balls 32 held by the holding member 33 can smoothly rotate on the base member 34.

According to this embodiment, the rubber legs 342a are provided on the region of the base member 34 corresponding to the steel balls 32 at the equiangular interval, whereby the rubber legs 342a provided on the base member 34 at the equiangular interval can uniformly receive the load of the base member 34. Thus, the base member 34 can be more stably supported.

According to this embodiment, the display screen turning apparatus 20 further comprises the rubber legs 342b provided under the portions in the vicinity of the four corners located outside the region of the base member 34 receiving the load of the display body 10 so that the rubber legs 342b provided in the vicinity of the four corners of the base member 34 can support the overall base member 34, whereby the base member 34 can be more stably supported.

According to this embodiment, the display screen turning apparatus 20 further comprises the rotating shaft portion 341 provided at the center of the base member 34 to protrude toward the turntable 31 for serving as the rotation center of the turntable 31, whereby the turntable 31 can easily rotate about the rotating shaft portion 341.

According to this embodiment, the turntable 31 is horizontally rotatable about the rotating shaft portion 341 serving as the rotation center, the display screen turning apparatus 20 further comprises the E-ring 36 for preventing the turntable 31 from slipping off the rotating shaft portion 341 and the groove portion 341a for mounting the E-ring 36 is provided on the outer peripheral surface of the rotating shaft portion 341 in the vicinity of the upper end, whereby the turntable 31 can be inhibited from slipping off the rotating shaft portion 341.

According to this embodiment, the base member 34 is made of sheet metal, whereby the base member 34 can be easily warped when the same is manufactured.

Although the present invention has been described and illustrated in detail, it is clearly understood that the same is by way of illustration and example only and is not to be taken by way of limitation, the spirit and scope of the present invention being limited only by the terms of the appended claims.

For example, while the display screen turning apparatus 20 is provided on the liquid crystal television 10 employed as an exemplary display in the aforementioned embodiment, the present invention is not restricted to this but the display screen turning apparatus 20 may alternatively be provided on a display such as an EL panel having a display screen (display panel) other than the liquid crystal panel.

While the rotatable turntable 31 and the rotatable display screen support mechanism 50 are employed in the aforementioned embodiment as examples of the support member, the present invention is not restricted to this but an unrotative support member may alternatively be employed.

While the base member 34 having a substantially trapezoidal shape in plan view is employed in the aforementioned embodiment, the present invention is not restricted to this but a base member having a substantially rectangular or circular shape in plan view may alternatively be employed.

While the base member 34 is so formed as to warp along arrow Z1 in the anteroposterior direction (direction X) of the display body 10 with the prescribed amount of warpage in the aforementioned embodiment, the present invention is not restricted to this the base member 34 may alternatively warp to upwardly protrude in the form of a semicircle having the top at the center.

What is claimed is:

1. A display, comprising:
a display screen;
a support member supporting said display screen;
a substantially planar base member so formed as to receive a load of said display screen applied to said support member on a partial region thereof and to warp in a direction opposite to the direction of deflection resulting from the load of said display screen with a prescribed amount of warpage when not receiving the load of said display screen;
a plurality of first rubber legs provided under said region of said base member receiving the load of said display screen;
a plurality of rolling elements annularly arranged between said support member and said base member for receiving the load of said display screen through said support member; and
a holding member holding said plurality of rolling elements and having a cylindrical shape, wherein
said prescribed amount of warpage is so set that the surface of said base member is substantially flattened when said base member receives the load of said display screen applied to said support member, and
said first rubber legs are provided on a region of said base member directly below said plurality of rolling elements at an equiangular interval.

2. The display according to claim 1, wherein
said base member is so formed that the maximum length in the anteroposterior direction of said display screen is smaller than the maximum length in the cross direction of said display screen, and
said base member is so formed as to warp along the anteroposterior direction of said display screen.

3. The display according to claim 2, wherein
said base member has a substantially trapezoidal shape in plan view, and
said base member is so formed as to warp along a direction perpendicular to the upper side or the lower side of said trapezoidal shape in plan view.

4. The display according to claim 1, further comprising second rubber legs provided under portions in the vicinity of four corners located outside said region of said base member receiving the load of said display screen.

5. The display according to claim 1, further comprising a rotating shaft portion provided at the center of said base member to protrude toward said support member, for serving as the rotation center of said support member.

6. The display according to claim 5, wherein
said support member is horizontally rotatable about said rotating shaft portion serving as the rotation center,
the base for a display screen further comprises a stop member for preventing said support member from slipping off said rotating shaft portion, and
a groove portion for mounting said stop member is provided on the outer peripheral surface of said rotating shaft portion in the vicinity of the upper end.

7. The display according to claim 1, wherein
said base member is made of sheet metal.

8. A display, comprising:
a display screen;
a support member supporting said display screen;
a substantially planar base member receiving a load of said display screen applied to said support member on a partial region thereof;
a plurality of rolling elements annularly arranged between said support member and said base member for receiving the load of said display screen through said support member, a holding member holding said plurality of rolling elements and having a cylindrical shape, and a plurality of first rubber legs provided under a region of said base member corresponding to said rolling elements, wherein
said base member is so formed that the maximum length in the anteroposterior direction of said display screen is smaller than the maximum length in the cross direction of said display screen, and so formed as to warp in a direction opposite to the direction of deflection resulting from the load of said display screen with a prescribed amount of warpage when not receiving the load of said display screen, said prescribed amount of warpage is so set that the surface of said base member is substantially flattened when said base member receives the load of said display screen applied to said support member, and said first rubber legs are provided on said region of said base member corresponding to said rolling elements at an equiangular interval.

9. The display according to claim 8, wherein said base member has a substantially trapezoidal shape in plan view, and said base member is so formed as to warp along a direction perpendicular to the upper side or the lower side of said trapezoidal shape in plan view.

10. The display according to claim 8, further comprising second rubber legs provided under portions in the vicinity of four corners located outside said region of said base member receiving the load of said display screen.

11. The display according to claim 8, further comprising a rotating shaft portion provided at the center of said base member to protrude toward said support member, for serving as the rotation center of said support member.

12. The display according to claim 11, wherein said support member is horizontally rotatable about said rotating shaft portion serving as the rotation center, the display further comprises a stop member for preventing said support member from slipping off said rotating shaft portion, and a groove portion for mounting said stop member, the groove portion being provided on the outer peripheral surface of said rotating shaft portion in the vicinity of the upper end.

13. The display according to claim 8, wherein said base member is made of sheet metal.

* * * * *